Dec. 2, 1969 D. W. HEESH 3,482,113
VARIABLE TRANSFER FUNCTION CIRCUIT
Filed June 1, 1966
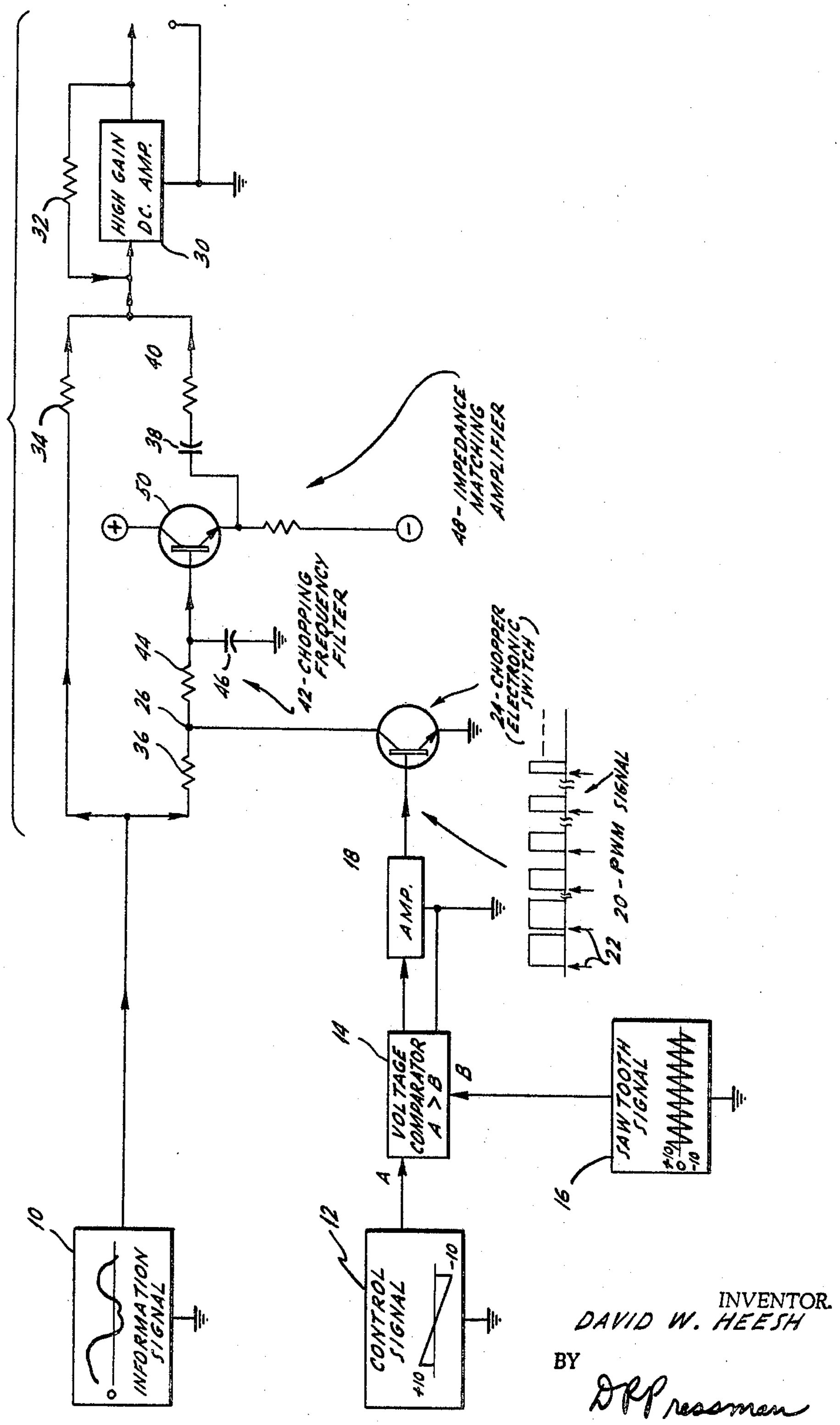
INVENTOR.
DAVID W. HEESH
BY
D R Pressman
ATTORNEY United States Patent Office 3,482,113
Patented Dec. 2, 1969

3,482,113

VARIABLE TRANSFER FUNCTION CIRCUIT

David W. Heesh, Santa Ana, Calif., assignor to Philco-Ford Corporation, Philadelphia, Pa., a corporation of Delaware Filed June 1, 1966, Ser. No. 554,555
Int. Cl. G06g 7/12
U.S. Cl. 307—229 9 Claims The present invention relates to a variable transfer function circuit, and more particularly to a circuit for controlling the phase of a first signal according to the amplitude of a second signal. Such a circuit is useful in servomechanism control applications wherein the first signal (whose phase is to be controlled) is an information signal of the feedback or error type and the second signal is a control signal whose amplitude is proportional to a given quantity such as time or position. In order to maintain a stable servomechanism loop, the phase of the information signal usually must be continuously changed as a function of the amplitude of the control signal. One exemplary application for such a circuit is found in conjunction with guided missiles wherein the phase of the information signal which directs and adjusts the missile's flight path must be changed as a function of the distance or time through which the missile has travelled from firing in order to maintain a stable feedback loop.

In prior art systems of this type, the use of electromechanical components, which are inherently unreliable and unsuitable for varying environmental conditions, were required. Further, such prior art systems were not capable of responding to different types of control signals, but usually were suitable for use with a single predetermined type control signal only.

Accordingly several objects of the present invention are: (1) to provide a circuit for controlling the phase of an information signal according to the amplitude of any control signal; (2) to provide such a system which is all electronic in nature and requires no mechanical or moving parts; (3) to provide such a system which is highly accurate, reliable, and adaptable for use under practically any environmental conditions.

One type of system according to the present invention is shown in the drawing.

SUMMARY

According to the present invention, an information signal is supplied to the input of an operational amplifier through an input impedance which has two parallel branches. A control signal is supplied to means for deriving a pulse width modulated (PWM) signal which is representative of the control signal. This PWM signal is used to drive a chopper or electronic switch which is connected in shunt with a reactive branch of the input impedance of the operational amplifier. As the width of the pulses in the PWM signal which is supplied to the chopper changes in accordance with the amplitude of the control signal, the effective impedance of the reactive branch and hence the effective impedance of the paralleled branches changes in accordance with the amplitude of the control signal. The information signal will thereby appear at the output of the operational amplifier with its phase continuously adjusted according to the amplitude of the control signal.

DESCRIPTION OF DRAWING

In the drawing, 10 represents a source of a time varying information signal, such as a servo error signal, the phase of which is to be adjusted according to the amplitude of a control signal provided by source 12. In the example given the control signal varies linearly from +10 to −10 volts over a relatively long period, say one second, and the information signal has a varying frequency from about 0.1 to 10 Hz. However it will be understood that according to the invention any type of control and information signals may be used. In the particular embodiment shown, the phase of the information signal is made to lead or advance in phase in inverse proportion to the amplitude of the control signal. Thus when the control signal from source 12 is at its most positive value, no phase change is provided in the information signal, but when the control signal is at its most negative value, the information signal is given a maximum phase lead.

A pulse width modulated (PWM) signal is derived from the control signal by means of a voltage comparator 14 and a sawtooth generator 16. Generator 16 provides the sawtooth signal as indicated which varies from +10 to −10 volts at a rate of about 14 kHz. Voltage comparator 14 provides an output of a constant value only when the control signal A is greater than the sawtooth signal B. The voltage comparator may comprise, for example, an easily saturated transistor amplifier in which the control signal is supplied to one input, such as the base, and the sawtooth signal is supplied to a second input, such as the emitter. The output of the voltage comparator is amplified in amplifier 18 and the resultant PWM version of the control signal is shown at 20.

It will be noted that the PWM signal 20 consists of a series of pulses of decreasing width but having equally spaced leading edges as indicated by the arrows 22. The equal spacing between the leading edges results from the fact that the sawtooth signal has abrupt transitions from its most positive value to its most negative value. Thus according to well known PWM principles, the width of the pulses in the PWM signal 20 are proportional to the amplitude of the control signal 12. It will be understood that, as indicated by the breaks in the baseline of signal 20, many pulses (in the example chosen, about 14,000 pulses) occur between the pulses of maximum width and the pulses of minimum width.

The PWM signal 20 is supplied to a chopper or electronic switch 24 which consists of a transistor whose emitter is grounded, whose base is connected to the output of amplifier 18, and whose collector is connected to a point 26 in a network to be described below. The operation of chopper 24 is such that the pulses in PWM signal 20 will turn the chopper transistor on and thus provide substantially zero impedance between point 26 and ground during each of the pulses. Between pulses, the chopper transistor will be nonconductive, thereby providing a substantially infinite impedance between point 26 and ground during these intervals.

The information signal 10 is supplied to the input of an operational amplifier 28. As is well known, an operational amplifier consists of a series input impedance, a high gain direct current inverter amplifier, and a feedback impedance shunting the amplifier. The operation of the operational amplifier is such that the output thereof will be related to the input thereto solely according to the relationship between the feedback impedance and the series input impedance, irrespective of the gain value of the DC amplifier, so long as the gain thereof is made very high.

In the present case the DC amplifier, which has a voltage gain of about 5,000, is shown at 30, the feedback impedance is a pure resistor 32, and the series input impedance comprises two branches connected in parallel. In the upper branch is a resistor 34 and in the lower branch is a resistor 36, a capacitor 38, and a resistor 40. Also included in the lower branch is a chopping frequency filter 42 consisting of a resistor 44 and a shunt capacitor 46. In addition an impedance matching amplifier 48 comprising a transistor 50 connected in the emitter follower configuration with an appropriate load impedance and bias supplies is connected between the output of filter 42 and capacitor 38. The chopper 24 is connected from point 26, the junction between resistors 36 and 44, to ground.

OPERATION OF CIRCUIT

When the control signal from source 12 is at its maximum positive value, the pulses in the PWM signal 20 will be of maximum width and will drive the chopper 24 into conduction almost all of the time, resulting in a substantial short circuit between point 26 and ground. Resistor 36 will then be connected effectively between the output of the information signal source 10 and ground and no portion of the input signal will be supplied to amplifier 30 by way of the lower, reactive path. Resistor 34 will thus constitute the sole series input impedance to the operational amplifier. Hence substantially no phase shift will be produced in the information signal.

As the control signal decreases in amplitude from the initial high positive value, the width of the pulses in the PWM signal will decrease. This will cause chopper 24 to be conductive an increasingly smaller percentage of time. This increases the average impedance between point 26 and ground and hence the average amplitude of the information signal supplied to the base of transistor 50. Since the chopping frequency, or the PWM frequency, which is determined by the frequency of the sawtooth signal from source 16, is much higher in frequency than either the information signal or the control signal, the chopping frequency filter 42 removes the chopping frequency components from the signal supplied to the base of transistor 50. When the control signal has reached its most negative value, so that chopper 24 is nonconductive almost all of the time, a substantial part of the information signal will be routed over the lower branch of the series input impedance of the operation amplifier. The parallel combination of the two parallel paths will now have a substantial reactive component due to capacitor 38; hence a phase lead will be produced in the information signal due to series capacitor 38. When the control signal 12 is at its maximum negative value, a maximum "lead" will be produced in the information signal.

It will be recognized that as the control signal decreases from the positive value to its negative value, the chopper 24 will become non-conductive a greater percentage of time and hence an increasing lead will be produced in the information signal in proportion to the amplitude of the control signal.

The impedance matching amplifier 48 is used to provide a low input impedance to the amplifier 30. Resistors 36 and 40 isolate the chopper 24 and the capacitor 38 respectively from the information signal at either terminal of resistor 34 when the chopper transistor is on.

While the control signal could be used to drive the chopper transistor directly so as to provide a variable impedance rather than a selectively infinite or zero impedance between point 26 and ground, it was found that the use of a PWB signal to drive the chopper transistor alternatively fully conductive or nonconductive provided a simpler and more accurate method of control. The impedance of the chopper transistor is difficult to control linearly, and if a PWM drive signal were not used, far more complicated circuitry would be required to effect linearity.

It will be seen from the above discussion that the present invention provides a novel and versatile yet simple way of controlling the phase of any signal according to the amplitude of any other signal. The invention can also be used to produce a time-variable lag in any information signal by interchanging the series input impedance network and the feedback resistor 32 of the operational amplifier. In this case the capacitor 38 will be connected as a feedback impedance so as to produce a lag, and the chopper 24 will effectively control the lag reactance of this feedback network.

If both a lead and a lag network are utilized, i.e., resistor 32 is replaced by a network identical to the series input impedance network and the present series input network is retained, a time variable bandpass filter or a time variable notch filter will be provided. That is, if the lead network includes a larger capacitor than the lag network, a variable bandpass filter will be provided. On the other hand if the lead network includes a smaller capacitor than the lag network, a variable "notch" network will be provided wherein information signals which fall within a particular variable frequency range will be greatly attenuated.

While there has been described what is at present considered to be the preferred embodiment of the invention, it will be apparent that various modifications and other embodiments thereof will occur to those skilled in the art within the scope of the invention. Accordingly, it is desired that the scope of the invention be limited by the appended claims only.

I claim:

1. A variable transfer function circuit comprising:
(a) a source of an information signal,
(b) a source of a control signal,
(c) means for deriving from said control signal a pulse-width-modulated signal which is representative of said control signal,
(d) an operational amplifier including a high gain direct current amplifier, a feedback circuit, and a series input circuit, one of said circuits containing two branches, one of which is resistive, and one of which contains a reactance,
(e) means for supplying said information signal to the input of said operational amplifier,
(f) electronic switching means having conductive and nonconductive states connecting said reactive branch to a point at reference potential so as to provide a substantially zero impedance in shunt with said reactive branch only when said switching means is conductive, the state of said switching means being controlled by said pulse-width-modulated signal.

2. The transfer function circuit of claim 1 wherein said one of said two circuits is said series input circuit, the reactive branch thereof containing a series capacitor for producing a phase lead on signals supplied thereto.

3. The transfer function circuit of claim 2 wherein said series input circuit also contains two resistors connected in series, the junction thereof being connected to said switching means.

4. The circuit of claim 1 wherein the other of said feedback and series input circuits of clause (d) is resistive.

5. The variable transfer function circuit of claim 1 wherein: (1) said electronic switching means comprises a transistor, the collector thereof being connected to said reactive branch and the emitter thereof being connected to said point at reference potential, and (2) said pulse width modulated signal is applied across the base and emitter of said transistor so as to drive said transistor alternately conductive and nonconductive.

6. The transfer function circuit of claim 1 wherein: (1) the amplitude of said control signal varies as a function of time, and (2) said means of clause (c) comprises: (a) source of a repetitive sawtooth signal and (b) a voltage comparator connected to said control signal source and said source of a repetitive sawtooth signal and arranged to supply an output signal of a given amplitude only when the amplitude of one of the inputs thereto is greater than the amplitude of the other of the inputs thereto.

7. The transfer function circuit of claim 1 wherein: (1) said feedback circuit comprises a resistor connected between the output and input of said direct current amplifier, (2) the resistive branch of said series input circuit comprises a resistor connected between the input of said operational amplifier and the input of said direct current amplifier thereof, (3) said reactive branch comprises: (a) a first resistor having one terminal connected to the input of said operational amplifier and another terminal connected to said switching means, (b) a filter comprising: (1) a second resistor having one terminal connected to said switching means and (2) a first capacitor having one terminal connected to the other terminal of said second resistor and another terminal connected to said point at reference potential, (c) impedance matching means comprising an emitter follower transistor amplifier having an input connected to the other terminal of said resistor, (d) a second capacitor having one terminal connected to the output of said emitter follower amplifier, and (e) a third resistor having one terminal connected to the other terminal of said capacitor and another terminal connected to the input of said direct current amplifier.

8. The transfer function circuit of claim 1 wherein: (1) said control signal source is arranged to supply a signal whose amplitude varies linearly as a function of time from a positive value to a negative value, (2) said (c) means comprises a voltage comparator and a source of a repetitive bipolar sawtooth signal, said comparator being arranged to supply an output signal of a given amplitude only when the absolute amplitude of said control signal is greater than the absolute amplitude of said sawtooth signal, and (3) said switching means comprises a transistor connected to the output of said comparator and arranged to become conductive only when said comparator supplies said output signal of said given amplitude.

9. The circuit of claim 9 wherein: (1) said feedback circuit of said operational amplifier is resistive, and (2) the reactive branch of said series input circuit includes a series capacitor for producing a phase lead on signals supplied thereto.

References Cited

UNITED STATES PATENTS

| | | | |
|---|---|---|---|
| 2,619,552 | 11/1952 | Kerns | 330—9 |
| 3,237,117 | 2/1966 | Collings et al. | 330—9 |

ARTHUR GAUSS, Primary Examiner

H. DIXON, Assistant Examiner

U.S. Cl. X.R.

307—240, 262; 330—9